United States Patent [19]

Hershey et al.

[11] Patent Number: 5,166,953
[45] Date of Patent: Nov. 24, 1992

[54] TECHNIQUE FOR FREQUENCY-HOPPED SPREAD SPECTRUM COMMUNICATIONS

[75] Inventors: John E. Hershey, Ballston lake; Amer A. Hassan, Clifton; Charles M. Puckette, Scotia, all of N.Y.

[73] Assignee: General Electric Company, Schenectady, N.Y.

[21] Appl. No.: 605,714

[22] Filed: Oct. 30, 1990

[51] Int. Cl.⁵ .............................. H04B 15/00
[52] U.S. Cl. .......................... 375/1; 375/120; 375/102
[58] Field of Search ................ 375/1, 120, 102

[56] References Cited

U.S. PATENT DOCUMENTS

4,972,444  11/1990  Melrose et al. ............. 375/120
5,056,117  1/1991  Gitlin et al. ................. 375/102

Primary Examiner—David Cain
Attorney, Agent, or Firm—Marvin Snyder

[57] ABSTRACT

A countermeasure to a partial-band follower jammer for frequency hopping spread spectrum communication systems employs an M-ary orthogonal frequency shift keyed (FSK) signaling system having q frequency channels available for hopping. During each signaling interval, the transmitter and receiver operate in either a conventional or unconventional mode. The conventional mode is selected by the transmitter and the receiver with a pseudorandom probability $p_c$. In this mode, the transmitter transmits one of r tones within the corresponding hop (i.e., within one of q channels), and $\log_2 r$ information bits are conveyed, while the receiver comprises a dehopper followed by noncoherent matched filters. The unconventional mode is selected with probability $1-p_c$. In this mode, the transmitter randomly chooses one of the r tones and transmits it in one of r channels within each hop, where the r channels are selected pseudorandomly. In the unconventional mode, $\log_2 r$ information bits are transmitted and the receiver comprises a bank of r radiometers.

8 Claims, 7 Drawing Sheets

TECHNIQUE FOR FREQUENCY-HOPPED SPREAD SPECTRUM COMMUNICATIONS

BACKGROUND OF THE INVENTION

1. Field of the Invention

The present invention generally relates to reliable communications systems and, more particularly, to a spread spectrum communications technique that offers an extra strategy to neutralize the effect of a "partial-band follower" jammer.

2. Description of the Prior Art

Spread spectrum communications offer several advantages in both military and civilian applications. These include low density power spectra for signal hiding, message screening from eavesdroppers and interference rejection. In the case of interference rejection, the interference may be accidental, that is, simply a part of the environment of the communication system, or may be intentional, that is, some form of jamming. There are several types of spread spectrum systems including direct sequence digital systems, frequency hopping systems, time hopping systems, pulsed frequency modulated (or chirp) systems, and various hybrids. Of these, the direct sequence digital systems and the frequency hopping systems are perhaps the more widely implemented.

In a direct sequence digital system, a pseudorandom code generator is used to modulate a frequency modulated carrier. In a frequency hopping system, a coherent local oscillator is made to jump from one frequency to another. The subject invention belongs to the frequency hopping type of spread spectrum communications system. A description of this and other types of spread spectrum communications systems may be found, for example, in *Spread Spectrum Systems*, 2nd Ed., by Robert C. Dixon, John Wiley & Sons (1984) and *Spread Spectrum Communications*, Vol. II, by M. K. Simon et al., Computer Science Press (1985).

While spread spectrum communications is a favorite electronic measure to gain immunity from jamming and detection, frequency-hopped spread spectrum systems may be easily jammed by a simple jamming process consisting of several tones or Gaussian noise pulses injected randomly among the frequency bins. This type of jamming, known as "partial-band" jamming, is recognized in the book by M. K. Simon et al., supra, to cause severe degradation in performance compared to other forms of interference. Partial-band jamming is especially damaging in the case when the jamming system (hereinafter "jammer") is sophisticated enough to follow the signal with high probability. There is therefore a need to make frequency-hopped spread spectrum communications more robust in the presence of follower (i.e., multiple tone or multiple Gaussian pulse) jammers.

SUMMARY OF THE INVENTION

It is therefore an object of the present invention to provide a frequency hopping technique in which the transmitted signal is random and undergoes frequency hopping with a probability $p_c$ which is unobservable, that is, cannot be estimated by a hostile jammer who could easily use such information in a communication game.

According to the invention, a new countermeasure to a partial-band follower jammer for frequency hopping spread spectrum systems is provided. The invention is described in terms of an M-ary orthogonal frequency shift keyed (FSK) signaling system in which there are q frequency channels available for hopping. During each signaling interval, the transmitter/receiver operates in one of two modes, conventional or unconventional. The conventional mode is selected by the transmitter and the receiver with a pseudorandom probability $p_c$. In this mode, the transmitter transmits one of M tones within the corresponding hop (i.e., within one of q channels), and $\log_2 M$ information bits are conveyed. The receiver, in the conventional mode, consists of a dehopper followed by noncoherent matched filters. The unconventional mode is selected with probability $1-p_c$. In this mode, the transmitter randomly chooses one of the r tones and transmits it in one of r channels within each hop, where the r channels are selected pseudorandomly, so that $\log_2 r$ information bits are transmitted. The receiver, in the unconventional mode, is comprised of a bank of r radiometers, each radiometer set to integrate all energy in one out of r channels selected. For simplicity, $r = M$ is assumed throughout, but it will be understood that in the more general case r is not necessarily equal to M.

The main source of interference is a partial-band Gaussian follower jammer (although the same technique can be used to neutralize multiple tone jammers). The jammer concentrates all its available power on a fraction $\rho$ of the spread spectrum bandwidth, where $\rho = s/q$, $s = 1, 2, \ldots, q$. Two modes of operation are also available to the jammer, conventional and unconventional. The jammer operates in the conventional mode with probability $p_j$. When operating in this mode, the jammer hops in the transmitter's channel, i.e., follows the transmitted signal. The unconventional mode of jammer operation is chosen with probability $1 - p_j$. In the latter mode the jammer does not jam the transmitter's channel but randomly hops through the other $q - 1$ channels.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawing(s) in which:

DETAILED DESCRIPTION OF A PREFERRED EMBODIMENT OF THE INVENTION

Figure 1:
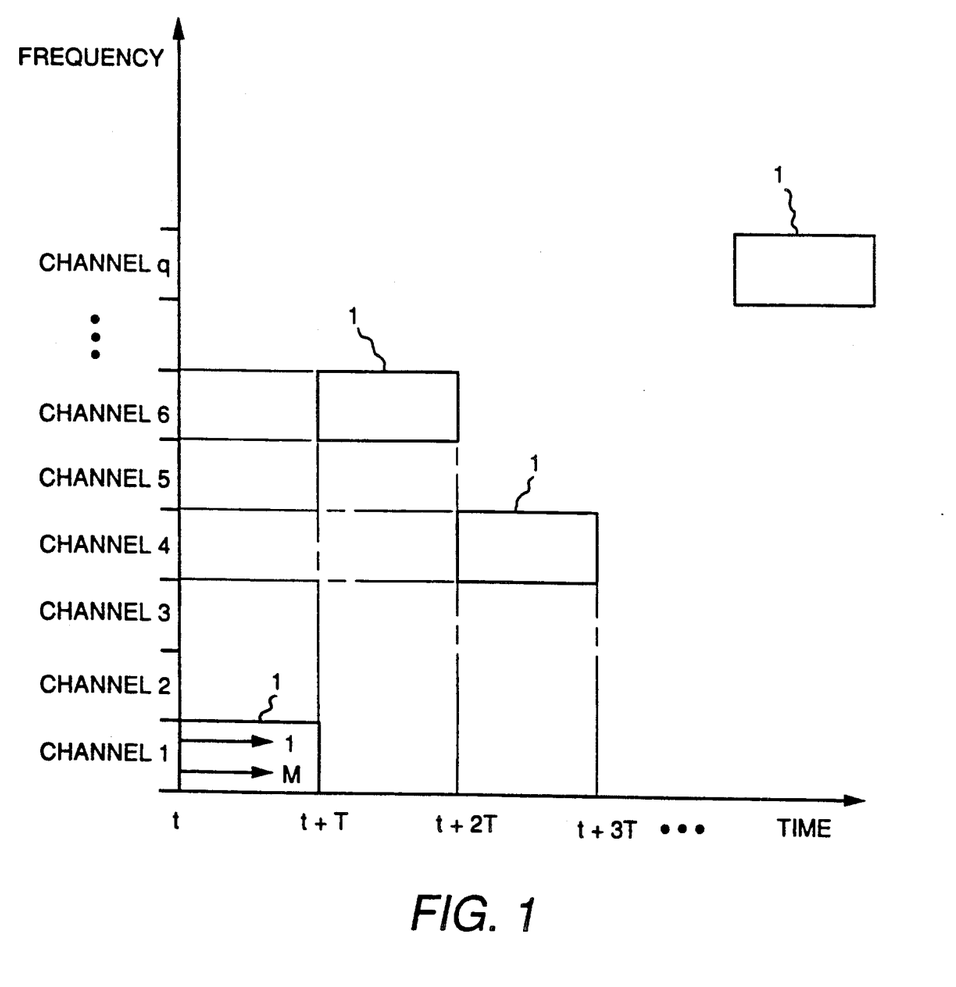
FIG. 1 is a frequency versus time diagram showing channels and signaling intervals useful in explaining the technique according to the invention.

Consider a frequency hopped spread spectrum (FHSS) communication system that uses M-FSK (M-ary orthogonal frequency shift keying) modulation. Let q be the number of frequency channels available for hopping. A diagram of frequency versus time is shown in FIG. 1. The available bandwidth is divided into a large number of contiguous frequency channels, 1 to q, shown along the ordinate. In any signaling time interval 1 of duration T, shown along the abscissa, the transmitted signal occupies one of the frequency channels 1 to q. The specific channel is selected pseudorandomly.

Figure 2:
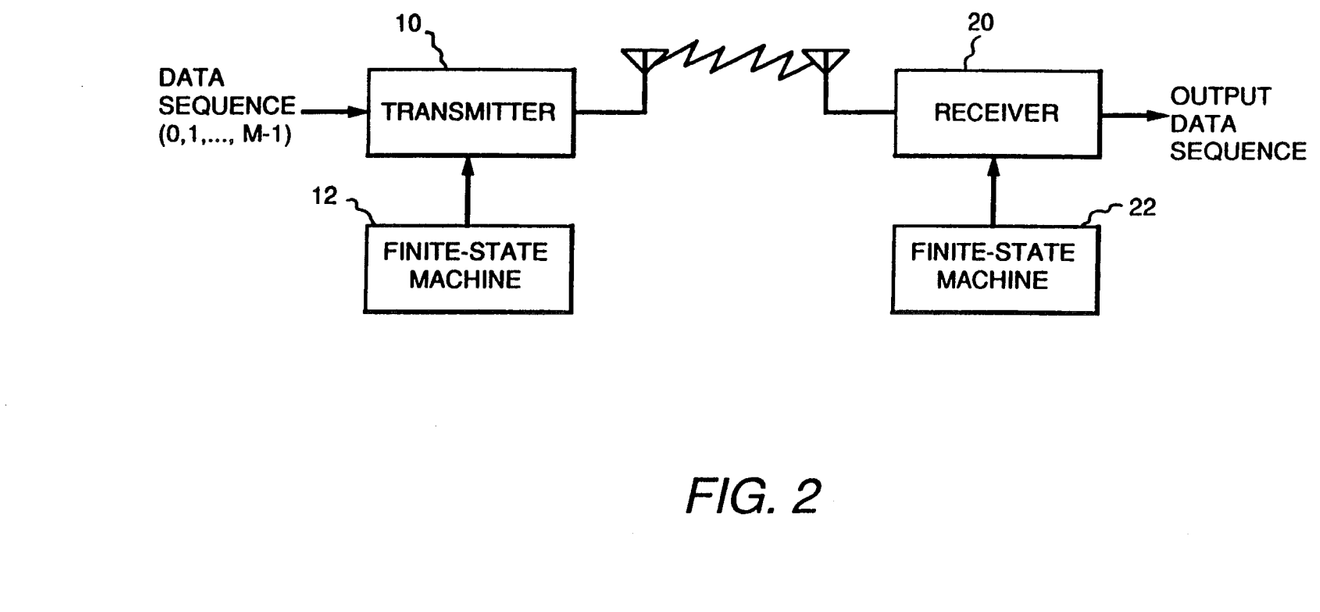
FIG. 2 is a generalized block diagram of a transmitter and receiver system according to the invention.

A generalized block diagram of the system according to the invention is shown in FIG. 2. A transmitter 10 receives a data sequence to be sent, which is modulated and transmitted to a receiver 20. The transmitter is controlled to transmit in either the conventional or unconventional mode by a finite-state machine 12. Similarly, the receiver is controlled by a finite-state machine 22 to receive data in either the conventional or unconventional mode.

The data to be communicated consist of a sequence of generally nonbinary symbols. Each symbol belongs to the alphabet $\{0, 1, \ldots, M-1\}$. Usually, M is a power of 2, for instance $M=2^m$, in which case a collection of m bits make up a symbol and, with no loss of generality, each symbol in the alphabet $\{0, 1, \ldots, M-1\}$ is an m-bit symbol. The data sequence is the input signal to an FSK modulator and a selector circuit, as will be described in more detail with reference to FIG. 3. If the FSK modulator input signal is $j\epsilon\{0, 1, \ldots, M-1\}$ (which could be a collection of m bits), the output signal of the FSK modulator is a sinusoid of frequency $f_j\epsilon\{f_0, f_1, \ldots, f_{M-1}\}$, where $\sin 2\pi f_0 t, \ldots, \sin 2\pi f_{M-1}$ are an orthogonal set of signals. The output signal of the selector circuit exhibits a frequency $F_0$ if the output signal of the finite state machine 12 is a logical "0"; otherwise, the output signal of the selector is the data symbol j, i.e., the selector is a multiplier.

Finite state machine 12 is a cryptographic device having an output state of 0 with probability $p_c$ and an output state of 1 with probability $1-p_c$. The output signal of a frequency synthesizer (not shown) in transmitter 10 comprises a collection of M carriers with frequencies $F_0, F_1, \ldots, F_{M-1}$ chosen pseudorandomly according to a pseudorandom sequence generator output signal. When the finite state machine produces a logical "0", the carrier corresponding to frequency $F_0$ is always chosen, regardless of the data symbol j transmitted. When the finite state machine produces a logical "1", $F_j$ is the selected frequency. The output signal of the frequency selector then hops the output signal of the FSK modulator to one of the q available channels.

Receiver 20 operates as follows. If finite state machine 22 produces a logical "0", the output signals of the radiometers are all ignored and the receiver is configured as a conventional frequency dehopper followed by an FSK demodulator which is a noncoherent matched filter. If the finite state machine 22 produces a logical "1", the FSK demodulator output signal is ignored and receiver 20 is configured as an unconventional bank of M radiometers tuned to the channels chosen by the frequency synthesizer. In this condition, the detected symbol is produced by the radiometer having the largest amplitude output signal.

The transmitter, the receiver and the channel are described as follows:

Transmitter/Receiver

Figure 3:
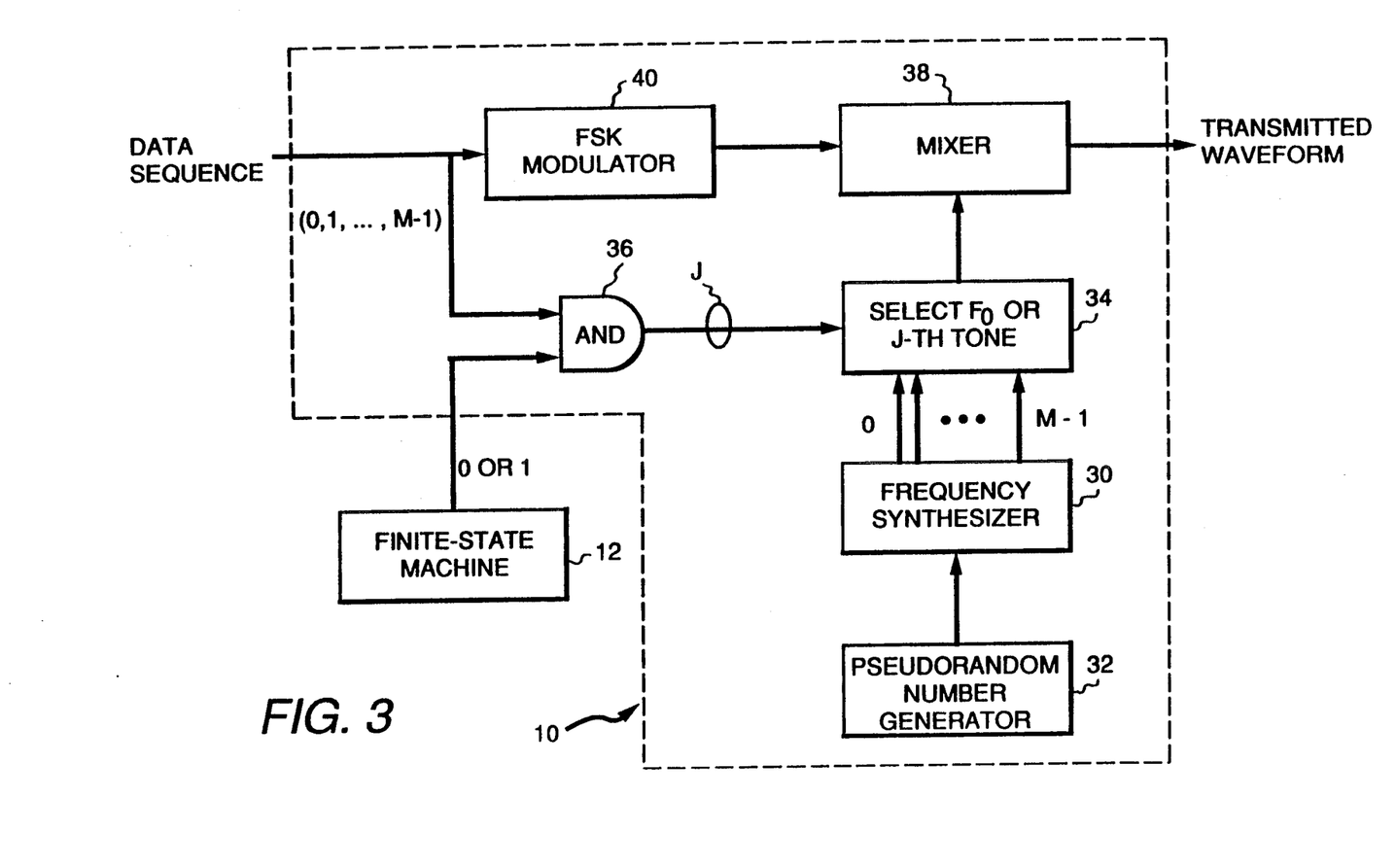
FIG. 3 is a detailed block diagram of a frequency hopped spread spectrum transmitter which implements the technique described, according to the invention.

As shown in FIG. 3, transmitter 10 comprises a frequency synthesizer 30 which is driven by a pseudorandom number generator 32 and consequently frequency synthesizer 30 always produces, pseudorandomly, M selections of frequency $F_0, F_1, \ldots, F_{M-1}$. A selector circuit of multiplexer 34 selects the $j^{th}$ tone from the M selections, under the control of AND gate 36, and supplies the selected tone to a mixer 38. The data sequence to be transmitted is supplied to both AND gate 36 and an FSK modulator 40. The output signal of FSK modulator 40 is supplied to mixer 38, which produces the transmitted waveform. AND gate 36 is, in practice, a plurality of AND gates, one coding for each data symbol j, respectively. Each of these AND gates is enabled or inhibited by the output signal of finite state machine 12. The AND gate having an output signal corresponding to the data symbol j provides the output signal illustrated in FIG. 3 to the tone selector 34.

Thus the output signal of FSK modulator 40 is a sinusoid of frequency $f_j\epsilon$ ($f_0, f_1, \ldots, f_{M-1}$). On the other hand, the output signal of frequency synthesizer 30 is (simultaneously) a collection of M sinusoids with frequencies chosen pseudorandomly to be $F_0, F_1, \ldots, F_{M-1}$, where $F_j\epsilon\{F_1, \ldots, F_q,\}$ and $q>M$. More precisely, the pseudorandom frequencies are $F_{i_0}, \ldots, F_{i_{M-1}}$ since these frequencies change during each hop interval. It should be noted that frequencies $\{f_0, f_1, \ldots, f_{M-1}\}$ are different from frequencies $\{F_0, F_1, \ldots, F_{M-1}\}$ as the represent data in the conventional mode while the latter represent data in the unconventional mode.

For each signaling interval (see FIG. 1), transmitter 10 operates in one of two modes, conventional or unconventional. The conventional mode is selected with probability $p_c$. In this mode, the transmitter transmits one of M tones within the core hop (i.e., within one of the q channels), and $\log_2 M$ bits are transmitted. This is indicated in FIG. 3 where finite state machine 12 produces a logical "0" or "1" according to a pseudorandom probability $p_c$ or $1-p_c$, respectively. If the finite state machine produces a logical "0", modulator 40 is inhibited and tone $F_0$ at the output of frequency synthesizer 30 will always be selected. If the finite state machine produces a logical "1" and the data symbol input to AND gate 36 is j, then the $j^{th}$ pseudorandom tone is selected. As previously mentioned, AND gate 36 actually represents a bank of AND gates, one for each data symbol j, and all of which are enabled or inhibited by the finite state machine 12.

Figure 4:
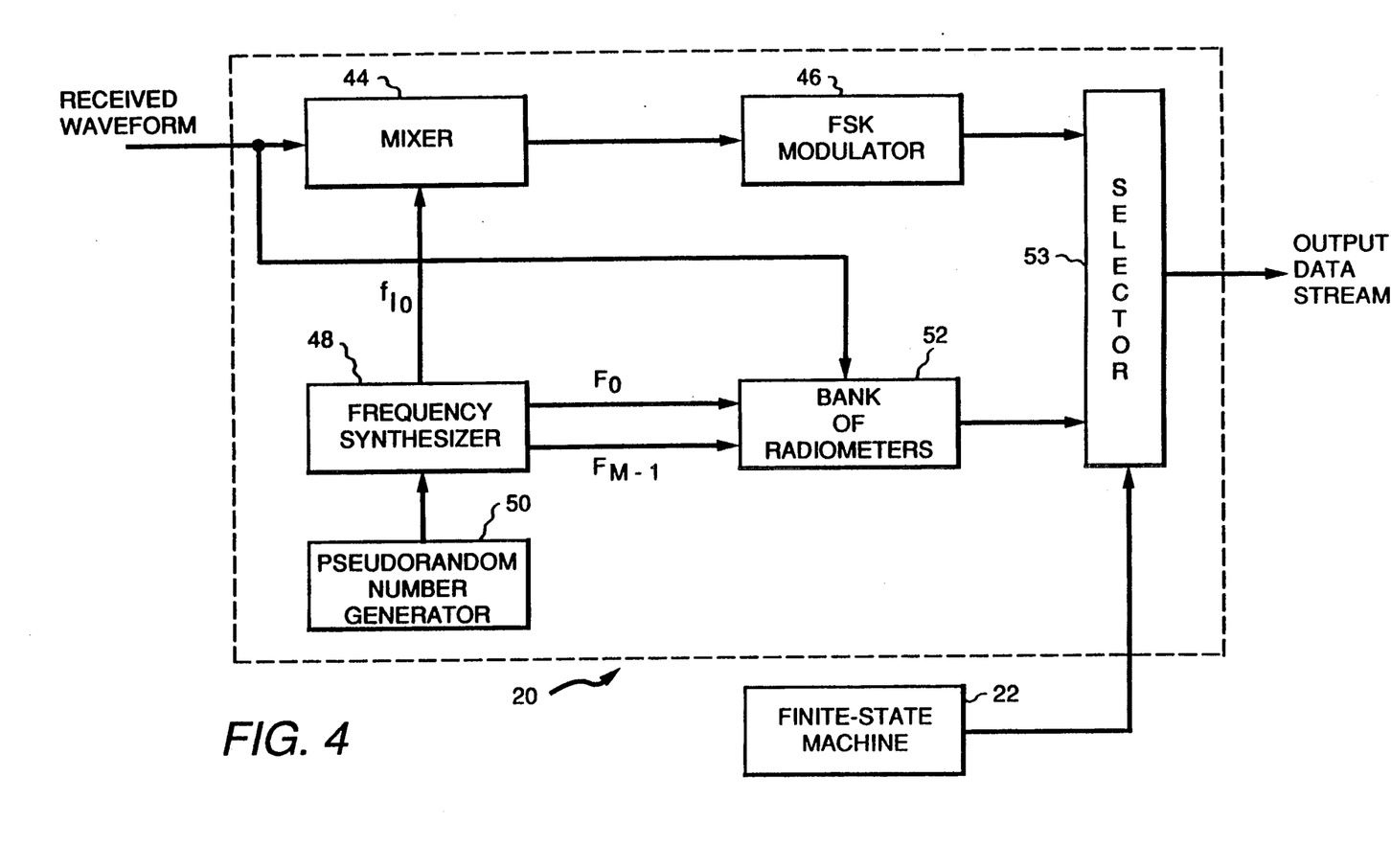
FIG. 4 is a detailed block diagram of a frequency hopped spread spectrum receiver which implements the technique described, according to the invention.

At the receiver, as shown in FIG. 4, the received waveform is applied to a mixer 44 which acts as a dehopper and provides an intermediate frequency output signal to an FSK demodulator 46. The local oscillator signal $f_{lo}$ for mixer 44 is supplied by a frequency synthesizer 48. Frequency synthesizer 48, like frequency synthesizer 30 of the transmitter, is controlled by a pseudorandom number generator 50 (which is also a cryptographic device) and supplies r tones $F_0, F_1, \ldots, F_{M-1}$ ($r=M$ in this instance), to a bank of radiometers 52. The output signals of both FSK demodulator 46 and the bank of r radiometers 52 (which produces the integral of the energy in one out of r channels selected) are supplied to a selector circuit 53 controlled by finite state machine 22. A logical "0" output signal from finite state machine 22 always selects the FSK demodulator output, but if the output signal of the finite state machine 22 is a logical "1", the radiometer channel with the largest energy is chosen as the transmitted symbol.

Figure 5:
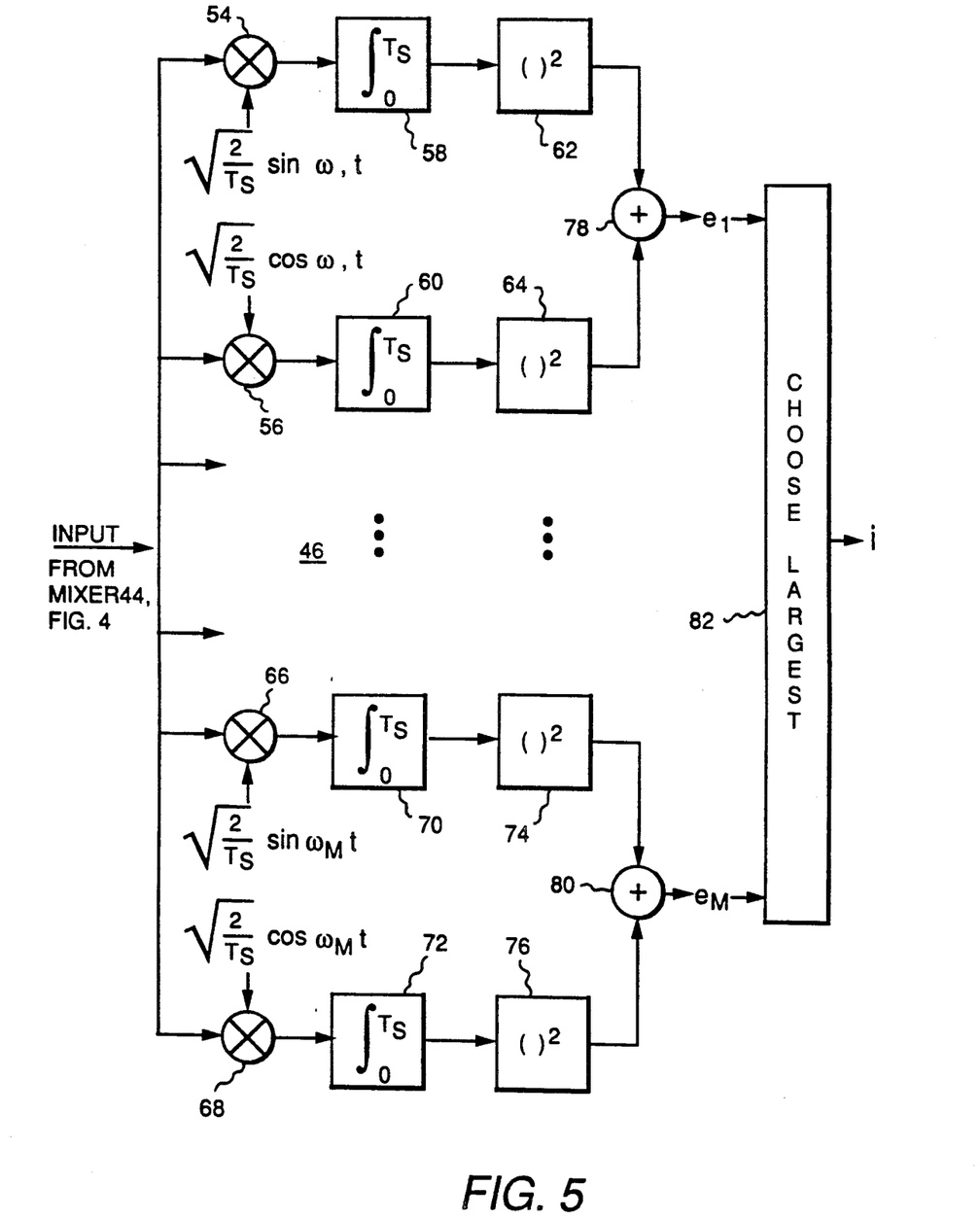
FIG. 5 is a detailed block diagram of the noncoherent M-FSK demodulator used in the frequency hopped spread spectrum receiver of FIG. 4.

FIG. 5 is a block diagram of FSK demodulator 46 of receiver 20, shown in FIG. 4. This demodulator is a noncoherent M-FSK detector comprising a plurality of essentially identical channels (or filters), all having a common input from mixer 44 of FIG. 4. In the diagram of FIG. 5, there are M pairs of channels or noncoherent matched filters, since M-ary orthogonal frequency shift keying is used. The first pair of channels respectively includes mixers 54 and 56, integrators 58 and 60, and squares 62 and 64. Mixers 54 and 56 receive, from local oscillators, orthogonal local frequencies $$\sqrt{\frac{2}{T_s}} \sin\omega_1 t \text{ and } \sqrt{\frac{2}{T_s}} \cos\omega_1 t.$$

respectively, where $T_s$ is the symbol duration. Similarly, the last pair of channels respectively includes mixers 66 and 68, integrators 70 and 72, and squarers 74 and 76. Mixers 66 and 68 receive, from local oscillators, orthogonal local frequencies $$\sqrt{\frac{2}{T_s}} \sin\omega_M t \text{ and } \sqrt{\frac{2}{T_s}} \cos\omega_M t.$$

respectively. The output signals of mixers 54, 56, 66, and 68 are integrated over the symbol duration, $T_s$, by integrators 58, 60, 70, and 72, respectively. The output signals of integrators 58 and 60 are squared by squarers 62 and 64, respectively, and the output signals of squarers 62 and 64 are summed in a summer 78 to produce a signal of energy $e_1$. Likewise, the output signals of integrators 70 and 72 are squared by squarers 74 and 76, respectively, and the output signals of squarers 74 and 76 are summed in a summer 80 to produce a signal of energy $e_M$. It will, of course, be understood that the other channel pairs or noncoherent matched filters (not shown) of FSK demodulator 46 produce output signals of energies $e_2 \ldots e_{M-1}$, respectively. Each of these channel pair output signals is supplied to a selector circuit 82 which selects, as its output signal the signal of largest energy. That is, the noncoherent M-FSK detector shown in FIG. 5 will produce as an output signal, the symbol "i" corresponding to the largest energy; i.e., $$i = \arg \max_j e_j$$

The unconventional mode is selected with probability $1-p_c$. In this mode, transmitter 10 (FIG. 3) randomly chooses one of the M tones and transmits it in one of M channels (or in one of M hops). It should be noted that the r tones provided by frequency synthesizer 48 of the receiver (FIG. 4) do not carry any information, but it is the r channels that have all the information. Therefore, $\log_2 r$ information bits are transmitted. The choice of r depends on a system tradeoff (usually data rate, complexity and throughput).

Channel

Figure 6:
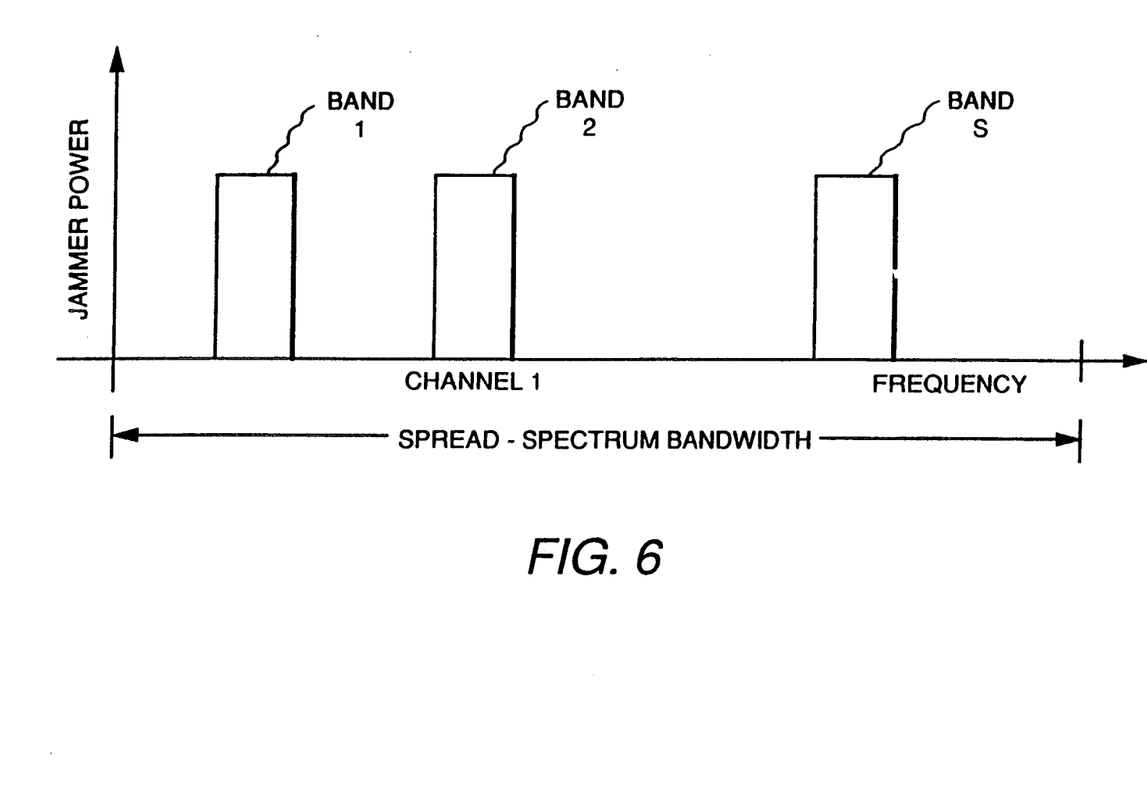
FIG. 6 is a graph showing the power spectral density of the jammer of the type against which the countermeasure of the present invention is effective.

For purposes of this invention, the main source of interference is considered to be a partial-band follower jammer. As indicated in FIG. 6, this jammer is comprised of s bands, each with power spectral density equal to the total jammer power divided by s/q. Similar to the communicator system, two modes of operation are available to the jammer, conventional and unconventional. The jammer selects operation in the conventional mode with probability $p_c$. In this mode, the jammer injects all its energy into the transmitter's channel. The decision to randomize the jammer's mode of operation is based on the knowledge that selection of the communication system's mode of operation is a randomized decision as well. The unconventional mode is chosen with probability $1-p_c$. In this latter mode, the jammer does not jam the transmitter's channel but distributes its s channels randomly over the other $q-1$ channels.

Synchronization

Synchronization is an extremely important consideration for spread spectrum communication systems. The synchronization problem is twofold. First, synchronization must be initially acquired. Second, once acquired, it must be maintained. The latter problem, maintenance of synchronization, is essentially the same for the system of the invention as it is for a conventional spread spectrum communication system, and the standard techniques can be used. The former problem, acquisition of synchronization, is mitigated by the invention. The reason for this is that the typical (or expected) synchronization attack of message preamble jamming can be partially overcome by the new modulation technique of the invention, as the preamble itself can be a time-of-day keyed word that is deterministically generated as a mixture of conventional and unconventional symbols.

Figure 7:
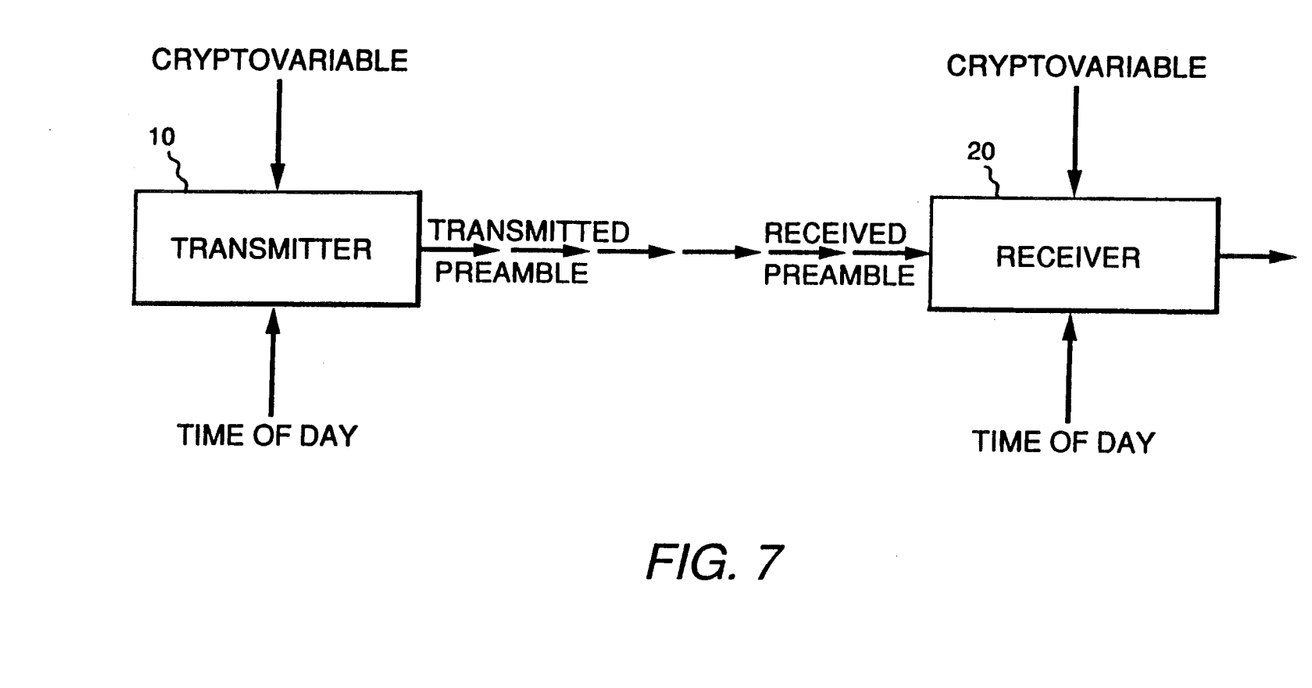
FIG. 7 is a simplified block diagram of the transmitter and receiver illustrating the method of synchronization employed in the invention.

Synchronization between the transmitter and receiver is illustrated in FIG. 7. Transmitter 10 receives two variables, a cryptovariable and the time of day, and generates a preamble which is transmitted to the receiver 20. The receiver has, as its input signals, the same two variables and, using the cryptovariable and its local time of day, decrypts the received preamble to attain synchronization.

The finite state machines 12 and 22 of FIGS. 3 and 4, respectively, use conventional cryptographic devices, such as one that implements the Data Encryption Standard (DES) described in Federal Information Processing Standards, Publication Number 46 (1977), National Bureau of Standards, or a U.S. Government National Security Agency (NSA) cryptographic device whose output signal is unpredictable once it has been set with a secret cryptovariable and an initialization quantity which, for purposes of this invention, is the time of day provided by a universal clock or a local clock that has been previously synchronized or "set to" a universal clock. The cryptographic device receives its cryptovariable through either a key list which is distributed through a secure courier channel prior to communications or via a public key cryptographic system such as that described in "Privacy and Authentication: An Introduction to Cryptography", by W. Diffie and M. Hellman in *Proceedings of the IEEE*, Vol. 67, No. 3, pp. 397–427 (1979), or the text books *Data Transportation and Protection* by J. Hershey and R. Yarlagadda, Plenum Press (1986), *Cryptography* by C. Meyer and S. Matyas, Wiley-Interscience (1982), or other similar publications concerning cryptography. The cryptographic devices are followed by appropriate software or hardware that converts the pseudorandom cryptographic bit stream into a sequence of bits that exhibit the correct balance of ones and zeros demanded by the ratio $p_c/(1-p_c)$.

Because knowledge of which of the preamble symbols are generated in the conventional mode and which symbols are generated in the unconventional mode is restricted to the communicators, any attempt at jamming will present a problem similar to that faced in attempts at message jamming. It is expected that two synchronizations will not be attempted with the same time of day quantity.

According to the invention, the communicator can observe the spread spectrum bandwidth and estimate the jammer's parameter $p_c$ using, for example, a spectrum analyzer or an acoustic-optic receiver (i.e., one that employs a Bragg cell). However, no information about $p_c$ is observable to the jammer, and thus the description "unobservable electronic countermeasure" is adopted. The reason that $p_c$ is unobservable is because by observing a single tone, the jammer cannot determine which mode the transmitter is using.

To gain a brief insight into system tradeoffs and the efficacy of the invention, if the transmitter is operating in the unconventional mode and the jammer selects the conventional mode, the jammer will actually be helping the communicator by adding more energy into the communications channel (since the receiver is operating as a noncoherent energy detector when in the unconventional mode), and with high probability that the receiver will produce the correct symbol. For a fixed $p_j$, the communicator will choose $p_c$ to minimize the probability of bit error.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is as follows:

1. A frequency-band spread spectrum communications system comprising:
    a transmitter capable of operating in either a conventional or unconventional mode, said transmitter when operating in said conventional mode transmitting one of M tones, where M is 2 raised to a power m, conveying $\log_2 M$ information bits within a corresponding one of q channels and when operating in said unconventional mode randomly selecting one of the M tones and transmitting it in one of r channels within each frequency hop, r being an integer greater than or equal to M, said r channels being selected pseudorandomly to convey $\log_2 M$ information bits, and q being the number of channels available per hop;
    a first finite state machine for causing said transmitter to operate in said conventional mode with a probability of $P_c$ and said unconventional mode with a probability $1-p_c$, $p_c$ being the probability that said machine will produce a logical "0";
    a receiver for receiving signals from said transmitter said receiver including a demodulator for providing a first output signal and a bank of radiometers for providing a plurality of second output signals; and
    a second finite state machine for controlling said receiver to select either said first output signal or a largest one of said plurality of second output signals, said first and second finite state machines being synchronizable with one another.

2. The communications system recited in claim 1 wherein said first and second finite state machines comprise cryptographic devices initialized with a common cryptovariable.

3. The communications system recited in claim 2 wherein said first and second finite state machines are synchronizable to a time of day variable, said time of day variable being identical at each of said first and second finite state machines.

4. The communications system received in claim 1 wherein said transmitter comprises:
    a frequency synthesizer for producing one of a plurality of frequencies $F_0, F_1, \ldots, F_{M-1}$;
    a pseudorandom sequence generator for controlling said frequency synthesizer to produce of said frequencies $F_0, F_1, \ldots, F_{M-1}$;
    a frequency shift keyed modulator for receiving a sequence of data symbols and providing, in response thereto, a modulated output signal in the form of a sinusoid of frequency $f_j \in \{f_0, f_1, \ldots, f_{M-1}\}$, where $\sin 2\pi f_0 t, \ldots, \sin 2 f_{M-1} t$ are an orthogonal set of signals occupying a frequency span that is less than the bandwidth of each of the q channels and $f_j$ is a frequency corresponding to a $j^{th}$ data symbol in said sequence;
    a mixer responsive to said frequency shift keyed modulator and a local oscillator input for generating a transmitter output signal;
    selection means responsive to said first finite state machine for selecting for application to said local oscillator input either a predetermined single frequency from said frequency synthesizer when said transmitter is in said conventional mode or a frequency corresponding to a data symbol in said code sequence when said transmitter is in said unconventional mode.

5. The communications system recited in claim 4 wherein said receiver comprises:
    a second frequency synthesizer for producing one of said plurality of frequencies $F_0, F_1, \ldots, F_{M-1}$, and for producing a local oscillator signal;
    a second mixer for receiving said signals from said transmitter and for receiving said local oscillator signal from said second frequency synthesizer, so as to generate an intermediate frequency signal in response thereto;
    a frequency shift keyed demodulator responsive to said second mixer for generating a demodulated output signal in response to said intermediate frequency signal;
    a second pseudorandom sequence generator for controlling said second frequency synthesizer to produce one of said frequencies $F_0, F_1, \ldots, F_{M-1}$;
    a bank of radiometers coupled to said second frequency synthesizer, each respective one of said radiometers being responsive to a corresponding respective one of said frequencies $F_0, F_1, \ldots, F_{M-1}$; and
    a selector means responsive to said second finite state machine for selecting as an output signal either the output signal of said frequency shift keyed demodulator when said receiver is in said conventional mode or the largest one of the signals from said bank of radiometers when said receiver is in said unconventional mode.

6. The communications system recited in claim 5 wherein said first and second finite state machines comprise cryptographic devices initialized with a common cryptovariable.

7. The communications system recited in claim 6 wherein said first and second finite state machines are synchronizable to a time of day variable, said time of day variable being identical at each of said first and second finite state machines.

8. The communications system recited in claim 5 wherein said frequency shift keyed demodulator comprises:

M plurality of pairs of channels, each one of said channels having a common input from said second mixer and including, in series, a third mixer, an integrator responsive to output signals from said third mixer, and a squarer responsive to output signals from said integrator, the third mixers of each pair of channels being further responsive to orthogonal local frequencies $$\sqrt{\frac{2}{T_s}} \sin\omega_M t \text{ and } \sqrt{\frac{2}{T_s}} \cos\omega_M t.$$

respectively, where $M=1, \ldots, M$ and $T_s$ is a time duration of a symbol, each respective one of said integrators being operative to integrate output signals of the respective third mixers coupled in series therewith over the time period $T_s$;

M plurality of summers, one for each pair of channels, each respective one of said summers being responsive to output signals of the squarers of a corresponding respective channel pair and providing an output signal corresponding to the sum of the output signals of the squarers of said corresponding respective channel pair; and selection means coupled to receive the output signals of said summers and for providing as an output signal the output signal of the one of said summers that is of largest energy.

* * * * *